United States Patent
Langlois et al.

(10) Patent No.: US 6,657,573 B2
(45) Date of Patent: Dec. 2, 2003

(54) PHASE TO SINE AMPLITUDE CONVERSION SYSTEM AND METHOD

(75) Inventors: Joseph Mathieu Pierre Langlois, Kingston (CA); Dhamin Al-Khalili, Kingston (CA)

(73) Assignee: Her Majesty the Queen in right of Canada, as represented by the Minister of National Defence, Ottawa (CA)

(*) Notice: Subject to any disclaimer, the term of this patent is extended or adjusted under 35 U.S.C. 154(b) by 0 days.

(21) Appl. No.: 10/217,482

(22) Filed: Aug. 14, 2002

(65) Prior Publication Data

US 2003/0062929 A1 Apr. 3, 2003

Related U.S. Application Data

(60) Provisional application No. 60/313,175, filed on Aug. 17, 2001.

(51) Int. Cl.[7] .................................................. H03M 1/66
(52) U.S. Cl. ........................ 341/147; 708/271; 708/274
(58) Field of Search .......................... 341/147; 708/271, 708/272, 273, 274, 275, 276

(56) References Cited

U.S. PATENT DOCUMENTS

| | | | | |
|---|---|---|---|---|
| 3,699,318 A | * | 10/1972 | Underkoffler et al. ...... | 708/274 |
| 3,887,911 A | * | 6/1975 | Bell ............................. | 341/138 |
| 4,809,205 A | * | 2/1989 | Freeman | |
| 4,905,177 A | * | 2/1990 | Weaver, Jr. et al. | |
| 5,321,642 A | * | 6/1994 | Goldberg | |
| 5,554,987 A | * | 9/1996 | Ooga ......................... | 341/147 |
| 5,999,581 A | * | 12/1999 | Bellaouar et al. | |

FOREIGN PATENT DOCUMENTS

GB     2 239 749     7/1991

* cited by examiner

Primary Examiner—Howard L. Williams
(74) Attorney, Agent, or Firm—Oblon, Spivak, McClelland, Maier & Neustadt, P.C.

(57) ABSTRACT

A phase-to-sinusoid-amplitude conversion system and method for use in, for example, direct digital frequency synthesizer applications. The system and method convert phase data to signal amplitude data using an approximation of the first quadrant of a sine function using a plurality of linear line segments of preferably equal length. Each segment is defined with a lower horizontal-axis bound; a lower vertical-axis bound; and a slope represented as a sum of a plurality of slope elements. Based on the approximation and for a given phase angle a set of values are evaluated, for each linear line segment, representing a product of (i) a horizontal displacement representing a difference between the prescribed phase angle and the lower horizontal-axis bound $x_i$ of a selected linear line segment where, for example, $x_i < X < x_{i+1}$ and (ii) each one of the slope elements of the selected linear line segment. The approximation of the sinusoidal amplitude is then obtained by adding one of the sets of values determined above with the lower vertical-axis bound of the selected linear line segment. With appropriate selection of the number of line segments (e.g., integer power of two) and slopes elements (e.g., expressed as a sum of desired powers of two), the operations are computationally efficient and improve spectral purity and reduces implementation costs and power consumption of resulting circuitry.

23 Claims, 12 Drawing Sheets

PHASE TO SINE AMPLITUDE CONVERSION SYSTEM AND METHOD

CROSS-REFERENCE TO RELATED APPLICATION

Benefit and priority is claimed under Title 35, USC, Section 119(e) of U.S. provisional patent application Ser. No. 60/313,175 filed Aug. 17, 2001, which is currently pending and is hereby incorporated by reference into this application.

TECHNICAL FIELD

The present invention relates to the field of phase to sinusoid amplitude conversion (PSAC) such as used in direct digital frequency synthesizers (DDFS) for converting phase data into amplitudes of a periodic function.

BACKGROUND INFORMATION

The synthesis of a desired frequency is a fundamental requirement in many fields, and specifically in modern frequency hopping wireless communications systems. In these types of systems, it is a key requirement to change the frequency of a reference oscillator very quickly and precisely while maintaining high spectral purity. DDFS systems are recognized as being best suited for such a purpose.

The basic principle of a DDFS involves the use of an accumulator to calculate phase angles around the unit circle. Sinusoid amplitudes corresponding to any such angle are obtained from a phase-to-sinusoid-amplitude converter. These samples can be passed to a digital-to-analog (DAC) converter then filtered by a low-pass filter. The output frequency is controlled by a frequency control word that is provided to the phase accumulator. The phase accumulator integrates the frequency control word every clock cycle and overflows through zero periodically resulting in a repeating ramp output.

The current design goal of DDFS architectures and techniques is to achieve a high level of spectral purity while reducing implementation costs and power consumption of the synthesizer. However, traditional architectures and techniques remain dependent on a look-up table and/or processing circuits that are complex, consume high power and require large integrated circuit space whether implemented as discrete components or as integrated single chip designs. These disadvantages pose particular difficulty for mobile wireless communication equipment where portable devices, to be practical, must be physically small with low battery drain yet must retain high spectral purity. Cellular telephones, military radios, satellite transponders or other modem transceivers are fundamentally designed to maximize the effective receive range, to capture and demodulate weak signals and minimize transmitted spurs and harmonics of the carrier. These design criteria are for the most part dependent on the spectral purity of the frequency generation components in the system.

Consequently, there is a need for phase to amplitude conversion for use in a DDFS, for example, that provides for a reduction in circuit complexity, a reduction in power consumption while maintaining a high level of spectral purity. More particularly, there is a need for a PSAC system and method that can imitate the behavior of a ROM based look up table by achieving good precision on the approximation of the sinusoid amplitude corresponding to all phase angles without a dependence on complex circuits that inherently use excessive power.

SUMMARY OF THE INVENTION

In accordance with one aspect of the present invention there is provided an apparatus (e.g., a PSAC) for determining an approximation of a sinusoidal amplitude for a given phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the apparatus comprising: a calculation mechanism receiving the signal for generating a set of outputs for each one of the plurality of linear line segments as a product of (i) a horizontal displacement representing a difference between the given phase angle and the lower horizontal-axis bound and (ii) each one of the plurality of slope elements; a selector mechanism for selecting (i) one of the set of outputs from the calculation mechanism and (ii) one of the lower vertical-axis bounds based on a selected one of the plurality of linear line segments; and an aggregation mechanism for evaluating the approximation of the sinusoidal amplitude as an aggregate of the selected one of the set of outputs from the selector mechanism and the one of the lower vertical-axis bounds.

In accordance with another aspect of the present invention there is provided, in a PSAC, a method of determining an approximation of a sinusoidal amplitude for a prescribed phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the method comprising: evaluating a set of values for each one of the plurality of linear line segments as a product of (i) a horizontal displacement representing a difference between the prescribed phase angle and the lower horizontal-axis bound and (ii) each one of the plurality of slope elements; and aggregating a selected set of values and a selected one of the lower vertical-axis bounds for a selected linear line segment to form the approximation of the sinusoidal amplitude for the prescribed phase angle.

In accordance with another aspect of the present invention there is provided a computer readable medium having stored thereon computer-executable instructions for determining an approximation of a sinusoidal amplitude for a prescribed phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the computer-executable instructions comprising the steps for: step for evaluating a set of values for each one of the plurality of linear line segments as a product of (i) a horizontal displacement representing a difference between the prescribed phase angle and the lower horizontal-axis bound and (ii) each one of the plurality of slope elements; and step for aggregating a selected set of values and a selected one of the lower vertical-axis bounds for a selected linear line segment to form the approximation of the sinusoidal amplitude for the prescribed phase angle.

In accordance with another aspect of the present invention there is provided an apparatus (e.g., a DDFS) comprising: means for generating a signal approximating a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements; generator means receiving the signal for generating a set of outputs for each one of the plurality of linear line segments as a product of a horizontal displacement representing a difference between the given phase angle and the lower horizontal-axis bound and each one of the plurality of slope elements; selector means for selecting one of the set of outputs from the generator means and one of the lower vertical-axis bounds based on a selected one of the plurality of linear line segments; means for evaluating an approximation of a sinusoidal amplitude as an aggregate of the selected one of the set of outputs from the selector mechanism and the one of the lower vertical-axis bounds; and means for converting the approximation of the sinusoidal amplitude from the adder means into an analog signal.

In accordance with another aspect of the present invention there is provided, in a DDFS, a method of determining an approximation of a sinusoidal amplitude for a prescribed phase angle, the method comprising: generating a signal approximating a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements; generating a set of outputs for each one of the plurality of linear line segments as a product of a horizontal displacement representing a difference between the given phase angle and the lower horizontal-axis bound and each one of the plurality of slope elements; selecting one of the set of outputs generated and one of the lower vertical-axis bounds based on a selected one of the plurality of linear line segments; and evaluating an approximation of a sinusoidal amplitude as an aggregate of the selected one of the set of outputs and the one of the lower vertical-axis bounds; and converting the approximation of the sinusoidal amplitude into an analog waveform.

BRIEF DESCRIPTION OF THE DRAWINGS

Examples of the present invention will now be described in relating to the accompanied drawings in which.

DETAILED DESCRIPTION

Figure 1:
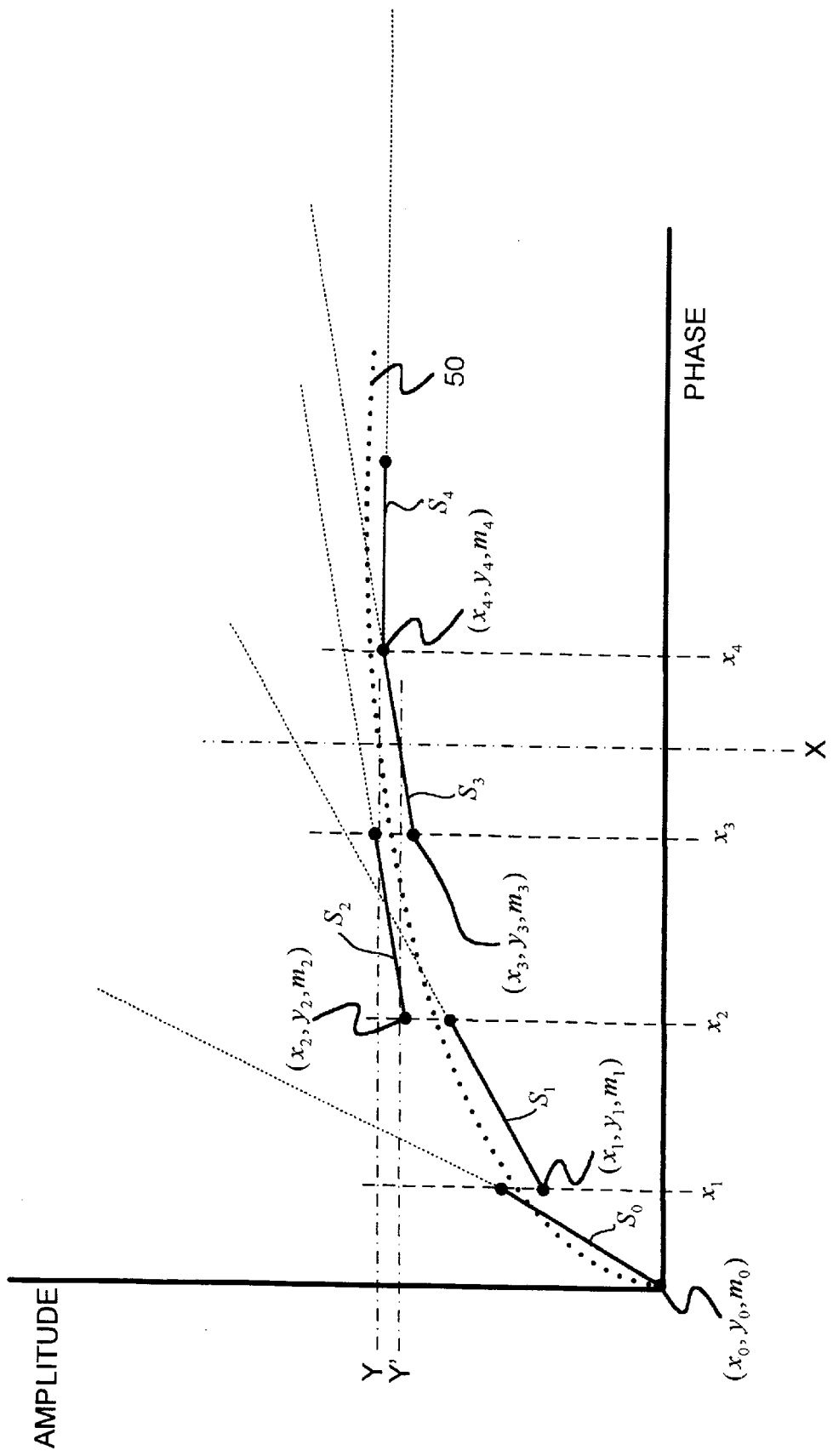
FIG. 1 illustrates a graphical representation of waveform modeling according to an embodiment of the present invention.

FIG. 1 is a graphical representation of an example model of a portion of a periodic waveform 50 (shown in dotted line) used in phase to sine amplitude conversion according to the present invention.

The waveform 50 is represented by an approximation of a portion (e.g., first quadrant of a sine function) using a plurality of equal length linear line segments $S_i$. Each line segment $S_i$ is defined by:

(a) a lower horizontal axis limit $(x_i)$;

(b) a lower vertical axis limit $(y_i)$; and (c) a slope $(m_i)$.

The line segments $S_i$ need not be connected end-to-end. The model supports discontinuities or jumps in the vertical axis direction between the line segments as shown in FIG. 1.

The number of line segments used to model a given waveform is equal to $t^a$, where a=0, 1, 2, . . . and t is selected based on the specific computing environment implementing the modeling. For example, t is equal to two (t=2) in an implementation using digital binary logic. The value of (a) is selected based on the waveform being modeled, accuracy, speed of computation and other factors.

The slope $(m_i)$ of each line segment is defined as the sum of a plurality of individual slope elements $(M_{ij})$ as follows:

$$m_i \equiv \sum_{j=1}^{P} M_{ij}$$

Each slope element $(M_{ij})$ has a value selected from a set of values defined by $\pm t^b$, where b=. . . ,−2,−1, 0, 1, 2, . . . and a value of zero. The parameter t is selected based on the specific computing environment implementation of the modeling as described above. The values of (b) are selected based on the waveform being modeled, accuracy, speed of computation and other factors.

EXAMPLE

Slope Construction

For example, slope $m_0$ for segment $S_0$ may have a slope construction defined as:

$m_0 = M_{01} + M_{02}$, for $P=2$

Further, for t=2 and b∈{−3,−2,−1,0}, the possible non-zero slope element values that can form the basis of the slope construction are:

$M_{ij} = t^b = 2^{-3} = \underline{1/8}$;

$M_{ij} = t^b = 2^{-2} = \underline{1/4}$;

$M_{ij} = t^b = 2^{-1} = \underline{1/2}$; and $M_{ij} = t^b = 2^0 = \underline{1}$.

In effect, for P=2, t=2, b∈{−3,−2,−1,0}, each slope $m_i$ can be constructed from values selected from the following set $\{0, \pm\frac{1}{8}, \pm\frac{1}{4}, \pm\frac{1}{2}, \pm 1\}$.

Therefore, for a given slope $m_0=1.25$, the slope construction can then be expressed specifically as:

$$m_0 = M_{01} + M_{02}, \text{ for } P=2$$

$$m_0 = 1.25 = \underline{1 + \tfrac{1}{4}}$$

For another given slope $m_1=0.875$, the slope construction can then be expressed specifically as:

$$m_1 = M_{11} + M_{12}, \text{ for } P=2$$

$$m_1 = 0.875 = \underline{1 - \tfrac{1}{8}}$$

The lower vertical axis limit $y_j$ for each segment are constant for a given model and various examples are provided below.

A periodic waveform modeled as described above has application in, for example, direct digital frequency synthesizers (DDFS) having phase-to-sinusoid amplitude conversion (PSAC) functions to determine an approximation (Y') of a periodic waveform amplitude (Y) for a given phase angle X.

Figure 2A:
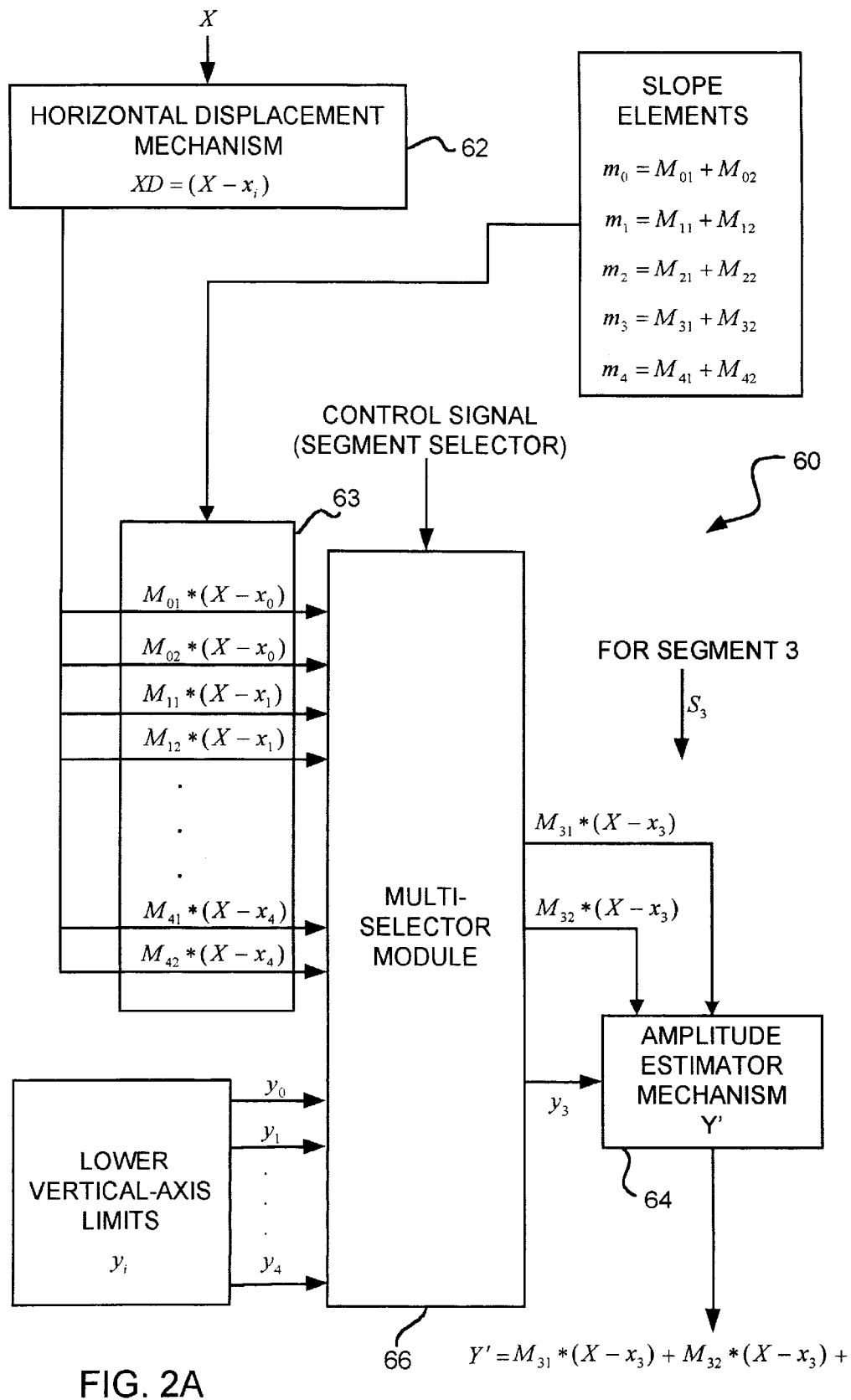
FIG. 2A illustrates a conceptual representation of a phase-to-sine amplitude conversion mechanism according to an embodiment of the present invention.

To assist in the description of the PSAC functions a conceptual representation 60 of an example approximation (Y') process/mechanism using the model of FIG. 1 is illustrated in FIG. 2A.

Referring to both FIGS. 1 and 2A, the following general steps are performed (more specific processes are described in conjunction with FIGS. 2B and 2C):

(a) evaluate a horizontal displacement (XD) for the given phase angle (X) as X−$x_i$, where $x_i$<X<$x_i$+1 using a horizontal displacement mechanism 62;

(b) calculate a set of values for each linear line segment as a product of the horizontal displacement and each one of the slope elements of the slope for a given linear line segment using a calculation mechanism 63; and (c) evaluate the approximation of the amplitude Y' using an amplitude estimator mechanism 64 as:
Y'=$m_i$×(X−$x_i$)+$y_i$=$m_i$×XD+$y_i$, for the segment of interest $x_i$ where the segment of interest is determined by a control signal (i.e., a segment selector) provided to a multi-selector module 66, which provides the appropriate values to the estimator mechanism 64.

Alternative representations of the above equation for a particular segment $S_3$ (with slope construction of P=2) are:

$$Y' = m_i \times (X - x_1) + y_i$$

$$Y' = m_3 \times (X - x_3) + y_3$$

$$Y' = (M_{31} + M_{32}) \times (X - x_3) + y_3$$

$$Y' = ((M_{31} \times (X - x_3)) + (M_{32} \times (X - x_3))) + y_3$$

$$Y' = (M_{31} \times XD) + (M_{32} \times XD) + y_3$$

The final equation for Y' is computationally efficient when t=2, since the multiply operations are accomplished in binary based implementations using simple bit shift operations. The multi-selector module 66 (e.g., multiplexers and the like described in more detail below) is used to receive all possible input values (i.e., (i) the product of all slope element values $M_{ij}$ and the horizontal displacement for a phase angle X and (ii) the lower vertical-axis bounds $y_i$ for all of the segments). Then for a particular phase angle X, the required addends are selected from the multi-selector module 66 to determine the amplitude approximation Y' as shown in FIG. 2A.

Figure 2B:
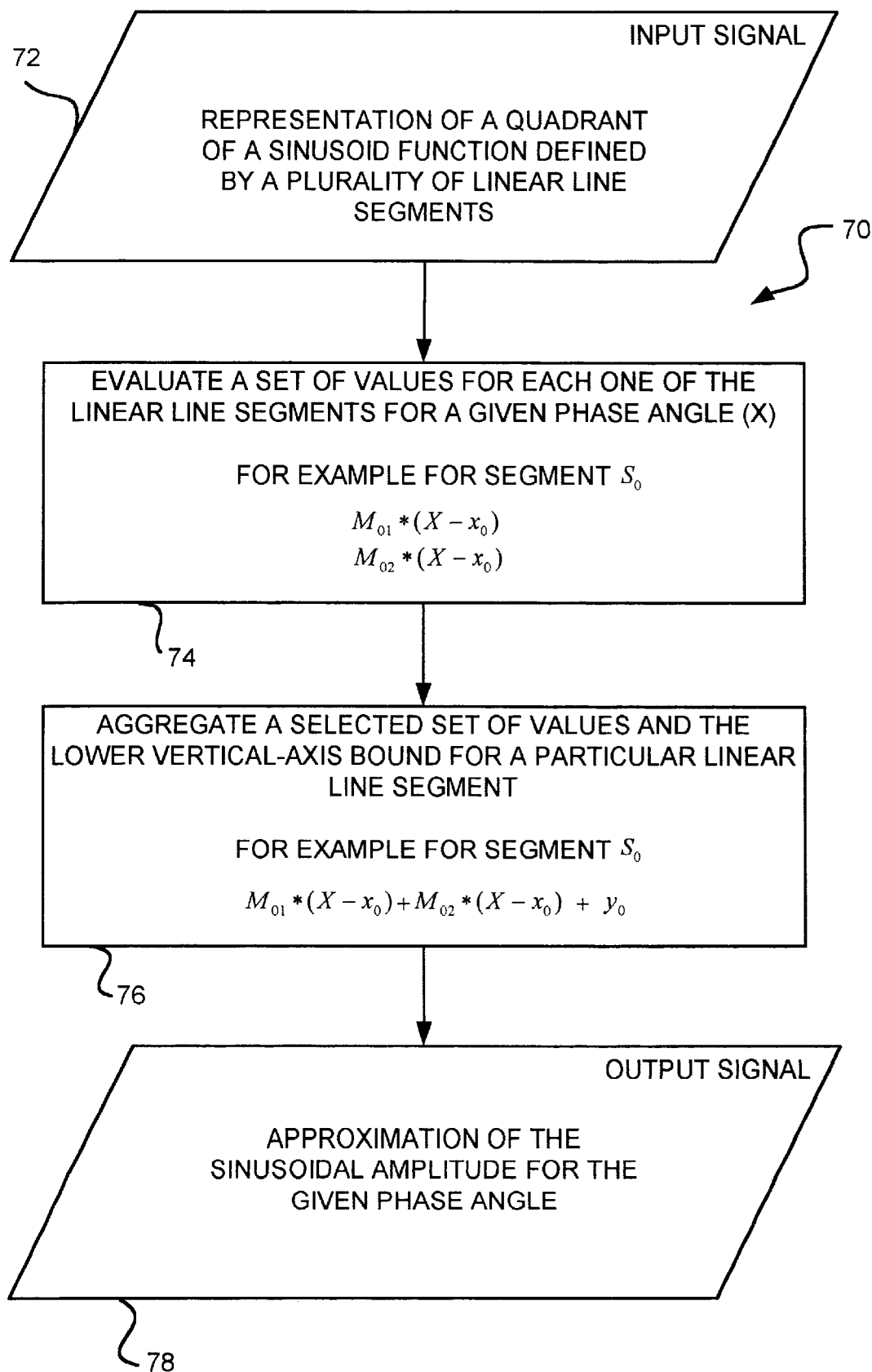
FIG. 2B illustrates a flow chart of a method of determining an approximation of a sinusoidal amplitude for a given phase angle in a PSAC environment according to an embodiment of the present invention.

FIG. 2B illustrates a flow chart of a method 70 of determining an approximation of a sinusoidal amplitude for a prescribed/given phase angle in a PSAC environment according to an embodiment of the present invention. In particular, the method 70 determines an approximation of a sinusoidal amplitude for a given phase angle (an output signal 78) from an input signal 72 representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements. The method 70 includes the following steps:

(a) step 74: evaluate a set of values for each one of the plurality of linear line segments as a product of (i) a horizontal displacement representing a difference between the prescribed phase angle and the lower horizontal-axis bound and (ii) each one of the plurality of slope elements; and (b) step 76: aggregate (i.e., add, sum, etc.) a selected set of values evaluated in step 74 and a selected one of the lower vertical-axis bounds for a selected linear line segment to form the approximation of the sinusoidal amplitude for the prescribed phase angle (i.e., the output signal 78).

Figure 2C:
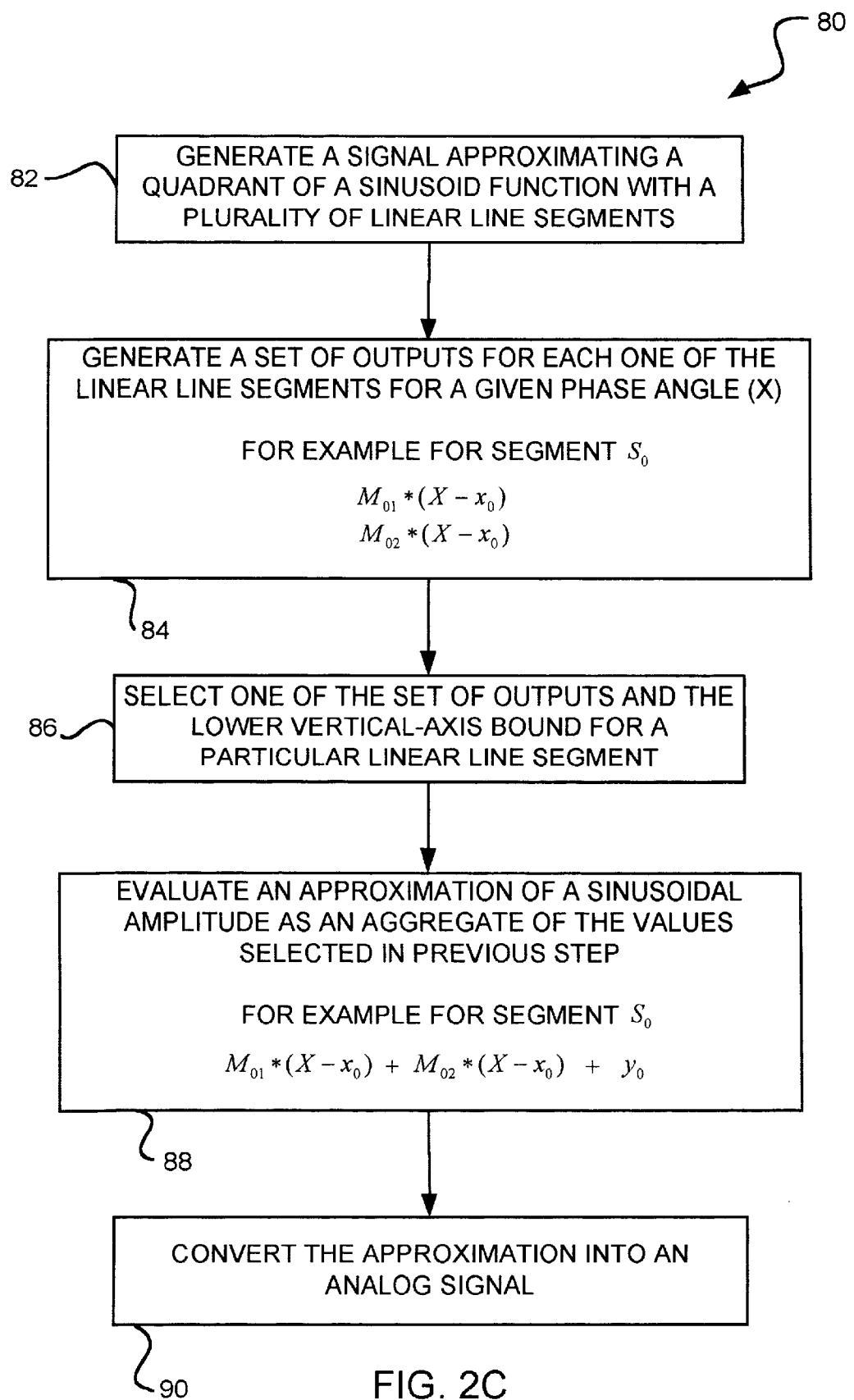
FIG. 2C illustrates a flow chart of a method of determining an approximation of a sinusoidal amplitude for a given phase angle in a DDFS/PSAC environment according to an embodiment of the present invention.

FIG. 2C illustrates a flow chart of a method 80 of determining an approximation of a sinusoidal amplitude for a prescribed/given phase angle in a DDFS/PSAC environment according to an embodiment of the present invention. The method 80 includes the following steps:

(a) step 82: generate a signal approximating a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements;

(b) step 84: generate a set of outputs for each one of the plurality of linear line segments as a product of a horizontal displacement representing a difference between the given phase angle and the lower horizontal-axis bound and each one of the plurality of slope elements;

(c) step 86: select one of the set of outputs generated from step 84 and one of the lower vertical-axis bounds based on a selected one of the plurality of linear line segments; and (d) step 88: evaluate an approximation of a sinusoidal amplitude as an aggregate (i.e., add, sum, etc.) of the selected one of the set of outputs from step 86 and the one of the lower vertical-axis bounds; and (e) step 90: convert the approximation of the sinusoidal amplitude into an analog signal (to form an analog waveform for multiple phase angles).

In a DDFS system, the ratio between the largest and smallest integer powers of two (i.e., $t^b$ where t=2) used to express the slopes $m_i$ can be, for example, equal to or less than $2^{32}$ and preferably as small as possible (e.g., equal to or less than $2^5$—i.e., the slope element values range from 0, 1, $\frac{1}{2}, \frac{1}{4}, \frac{1}{8}, \frac{1}{16}, \frac{1}{32}$). Reducing the ratio can simplify the PSAC (i.e., by decreasing cost and power consumption). Increasing the ratio generally gives more flexibility and can increase the spectral purity of the output. For example, the largest and smallest powers of two used to express segment slopes can be 1 and $\frac{1}{8}$, respectively, for a ratio of 8.

Further, in DDFS and PSAC based systems, the selection of the coefficients ($m_i$, $y_i$) for the various segments is directed to maximize the synthesizer's spectral purity, and not necessarily to minimize the maximum error on any sinusoid approximation. Therefore, the output waveforms produced by the present invention reveal jumps and discontinuities in the output waveform at the design low non-zero frequency. These jumps and discontinuities can improve spectral purity of a DDFS and PSAC.

Figure 3:
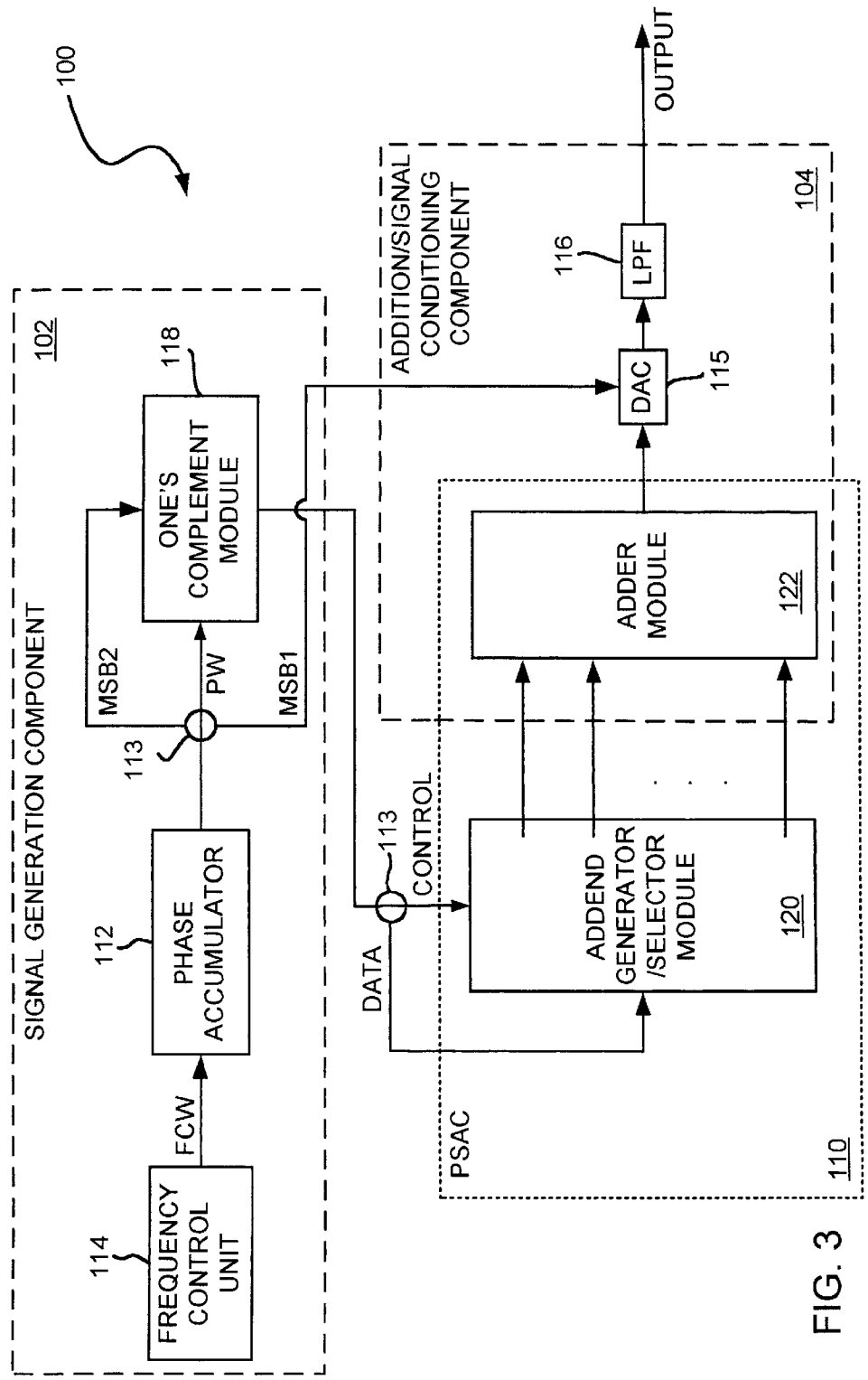
FIG. 3 illustrates a schematic representation of a direct digital frequency synthesizer (DDFS) implementation having a PSAC component according to an embodiment of the present invention.

FIG. 3 is a schematic representation of a direct digital frequency synthesizer (DDFS) 100 that includes a signal generation component 102 for signal generation functions, an addition/signal conditioning component 104 for generating an output signal from a phase to sinusoid amplitude converter (PSAC) 110 according to an embodiment of the present invention.

Figure 9:
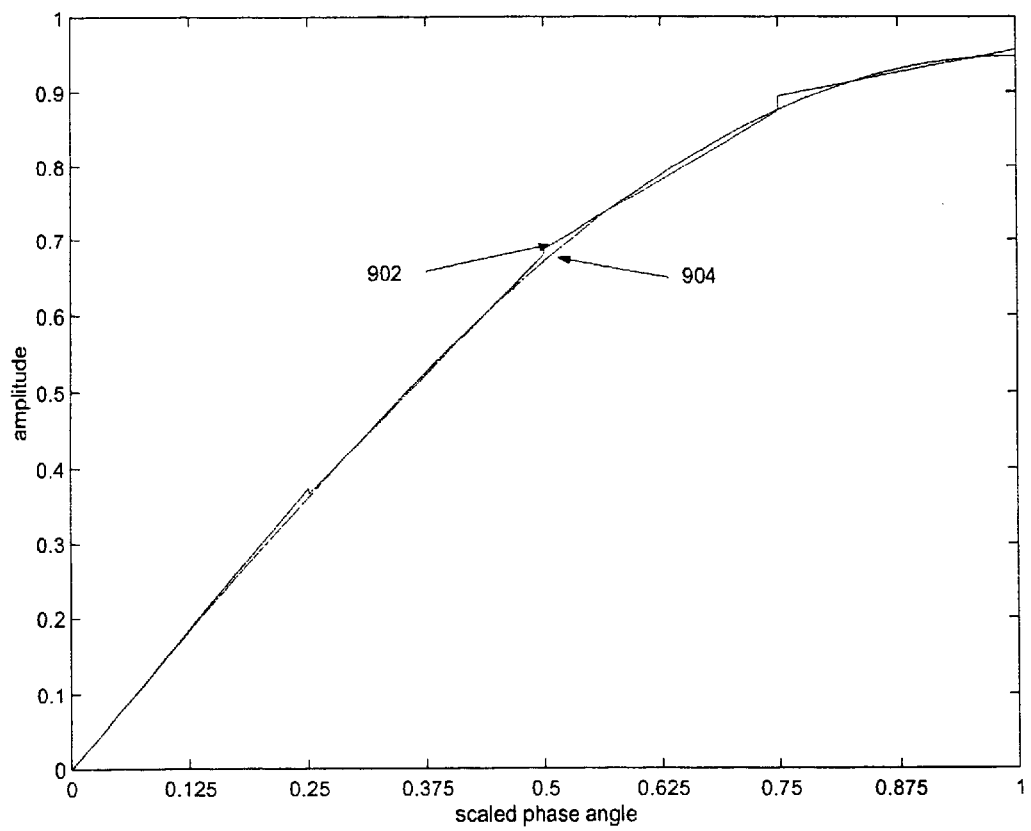
FIG. 9 illustrates a sample output of amplitude versus phase angle (scaled) using four segments from the DDFS/PSAC of the present invention.

As discussed above, the PSAC 110 approximates the first quadrant of a sine function with a plurality of equal length linear segments, the number of which is preferably an integer power of two, e.g. 2, 4, 8, 16, etc. FIG. 9 provides an example output with four segments. Trace 902 of FIG. 9 represents a line segment approximation and trace 904 represents a portion of the ideal sine curve with amplitude equal to 0.94851. Given a phase angle x, a fraction in the interval [0, 1], representing an angle expressed in radians in the interval [0, π/2], the corresponding sinusoid amplitude is approximated as:

$$\sin\left(x \times \frac{\pi}{2}\right) = \cos\left(x \times \frac{\pi}{2} - \frac{\pi}{2}\right) \cong m_i \times (x - x_i) + y_i, \ x_i \le x < x_{i+1} \quad (1)$$

or in expanded form:

$$\sin\left(\frac{\pi x}{2}\right) = \quad (1)$$

$$\cos\left(\frac{\pi x}{2} - \frac{\pi}{2}\right) \cong \begin{cases} y_0 + m_0(x - x_0), & x_0 \le x < x_1 \quad (x_0 = 0) \\ y_1 + m_1(x - x_1), & x_1 \le x < x_2 \\ \vdots \\ y_i + m_i(x - x_i), & x_i \le x < x_{i+1} \\ \vdots \\ y_{s-1} + m_{s-1}(x - x_{s-1}), & x_{s-1} \le x < x_s \quad (x_s = 1) \end{cases}$$

where (from Equation 1):
$m_i$ is a segment's slope,
$x_i$ is a lower horizontal axis limit of a segment, and
$y_i$ is a lower vertical axis limit of a segment.

If there are S linear segments, numbered from 0 to S-1, and, if the segments are equal in length, then the segment bounds $x_i$ are given by i/S, the first ($x_0$) being zero and the last ($x_s$) being one. If S is equal to an integer power of two, and x is expressed as a binary fraction of the form $0.b_0b_1b_2b_3$ . . . , then the difference ($x-x_i$) is equal to a simple truncation of a number of most significant bits of x. The number of truncated most significant bits (MSB) is equal to the logarithm in base 2 of S (log2(S)).

For example, if S is equal to 8 equal length segments, then the segment bounds $x_i$ will be equal to {0, 0.125, 0.25, 0.375, 0.5, 0.625, 0.75, 0.875, 1}, and the difference ($x-x_i$) will be equal to the fraction x truncated of its three most significant bits.

The slope of each segment $m_i$, with reference to Equation (1), is selected to be expressed as a sum of desired powers of two. The number of desired powers of two can be any integer greater or equal to one, preferably ranging from 1 to 5, and most preferably it is the integer two. The DDFS 100 increases in performance and accuracy as the integer increases. However, the use of a large integer can increase the size, complexity and power consumption of the DDFS 100.

The ratio between the largest and smallest integer powers of two used to express the slopes $m_i$ is preferably as small as possible (e.g., equal to or less than 32). Reducing the ratio can simplify the PSAC 110 (i.e., by decreasing cost and power consumption). Increasing the ratio generally gives more flexibility and can increase the spectral purity of the output. For example, the largest and smallest powers of two used to express segment slopes can be 1 and ⅛, respectively, for a ratio of 8.

As described above, the selection of coefficients ($m_i$, $y_i$) for the various segments is made to maximize the synthesizer's spectral purity, and not necessarily to minimize the maximum error on any sinusoid approximation.

Referring specifically to FIG. 3, the signal generation component 102 of the DDFS 100 includes a phase accumulator 112 for receiving a digital input word (known in the art as a frequency control word (FCW)) generated by a frequency control unit 114. The output of the phase accumulator 112 represents an M-bit wide signal. The M-bit wide signal is partitioned using a partioner/splitter 113 into a most significant control bit; a second most significant control bit and a phase word. The most significant bit (MSB1) of the M-bit wide signal represents its sign and is applied to a Digital to Analog Converter (DAC) 115 followed by a Low Pass Filter (LPF) 116 (as part of the addition/signal conditioning component 104). Although the DDFS 100 shown in FIG. 3 generates an output in sign and magnitude format, a format converter block (not shown) could be inserted before the DAC 115 as well known in the art.

The second most significant bit (MSB2) of the M-bit wide signal (output from the phase accumulator 112) represents an invert bit and is applied to a one's complement module 118 (also referred to as an inverter) to assist in management of the sinusoidal symmetry of a resulting waveform. The remaining output represents the phase word (i.e., a W-bit wide control signal, where W=M−2) of the phase accumulator 112 is applied directly to the one's complement module 118. The role of one's complement module 118 is to invert an input signal such that 1s become 0s and 0s become 1s whenever the invert bit is a 1, and to pass the input signal, without change, whenever the invert bit is a 0.

The PSAC 110 includes an addend generator/selector module 120 and an adder module 122. The module 120 includes the functionality of horizontal displacement mechanism 62, the calculation mechanism 63 and the multi-selector module 66 shown in FIG. 2A and receives the W-bit wide signal (after processing through the signal generation component 102 described above) and is interpreted as a phase angle.

The W-bit wide signal is divided into two components:
(1) a control signal component: log2(S) MSBs (bits wide); and
(2) a data signal component: W-log2(S) LSBs (bits wide);
where as described above S represents the number of linear segments used in the calculation of the sine amplitude approximation. The adder module 122 includes the functionality of the amplitude estimator mechanism 64 of FIG. 2A.

Figure 4:
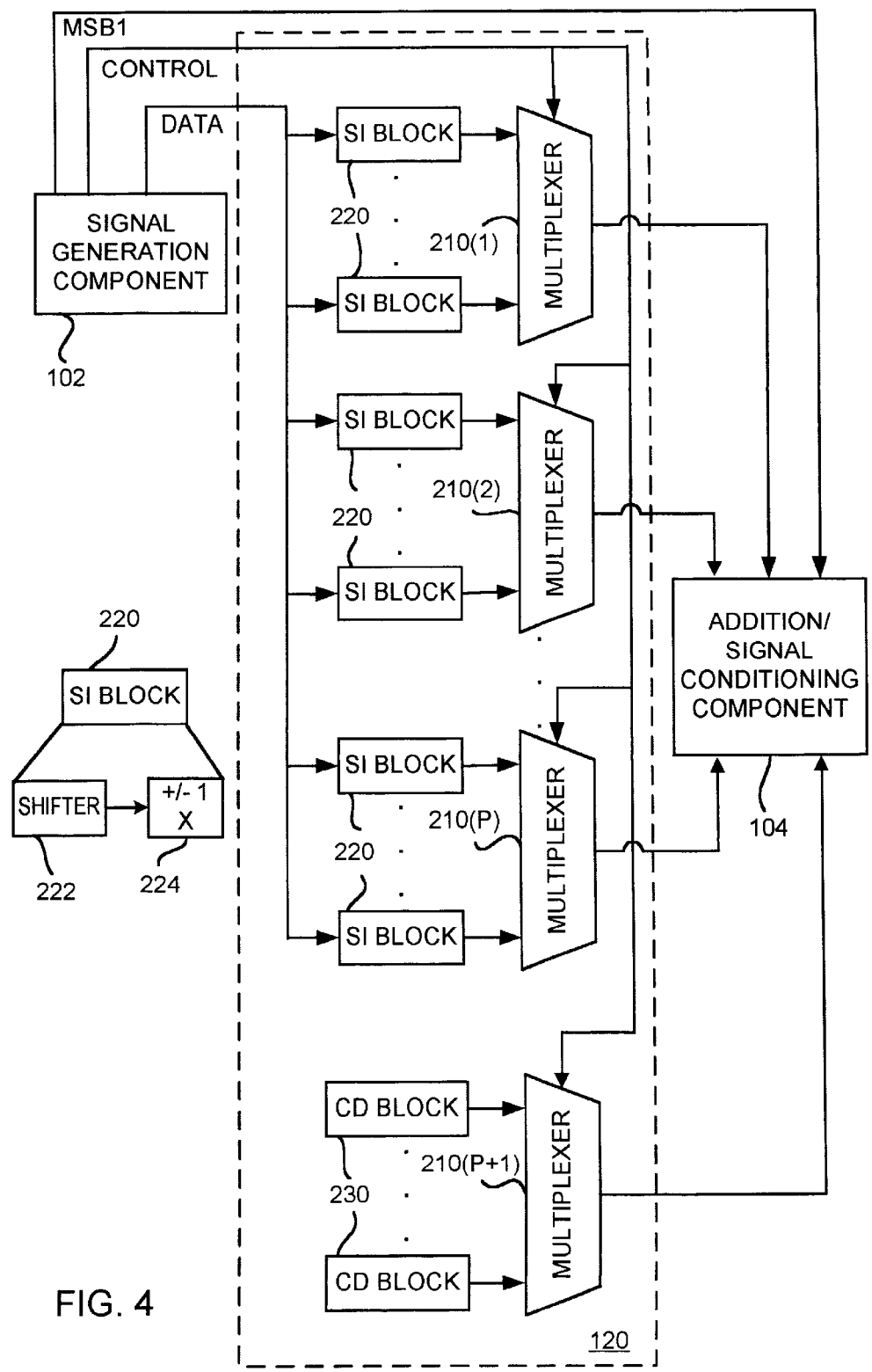
FIG. 4 illustrates a detailed schematic representation of the addend generator/selector module shown in FIG. 3 according to an embodiment of the present invention.

Further details of the structure and operation of the addend generator/selector module 120 are described in conjunction with FIG. 4.

Output from the module 120 is made up of P+1 signals that are passed to the adder module 122. P represents the number of powers of two that are summed to equate one slope coefficient. Therefore, the output from the module 120 includes P shifted versions of the M-bit wide signal (from the phase accumulator 112) and another signal that represents a segments amplitude $y_i$.

The adder module 122, also of the addition/signal generation component 104, then calculates the sum of the P+1 signals to generate an approximated sinusoid amplitude that is L-bits wide for subsequent processing by the DAC 115 and the LPF 116, both of the addition/signal generation component 104.

In particular, the DAC 115 receives the approximated sinusoid amplitude (in sign and magnitude format) from the adder module 122 and its sign from the phase accumulator module 112 and produces an analog waveform corresponding to an input word. The analog waveform is then passed through the LPF 116 to reduce harmonic and other high frequency noise spurs and may include amplification, impedance matching or other functions well known in the art to buffer the analog waveform with the application.

A detailed schematic representation of the addend generator/selector module 120 of the PSAC 110 of FIG. 3 is illustrated in FIG. 4. As described above, the module 120 receives two signals: the control signal that is log2(S) bits wide and the data signal that is W-log2(S) bits wide. The control signal is used to select appropriate input ports from (P+1) multiplexers 210 (1), 210(2), . . . , 210 (P−1), 210(P), 210(P+1). Each multiplexer 210 includes S input ports where ports may be combined if they have equal input signals (as illustrated in subsequent examples).

The input ports of the first P multiplexers 210(1) to 210(P) are provided with output from shift/sign inversion (SI) block mechanisms 220, which receive the data signal input from the signal generation component 102 of the DDFS 100. Each SI block 220 includes a shifter block 222 and a +/−1 multiplier 224 (shown in the inset diagram of FIG. 4). The number of the shift position imposed on the input data depends on the portion of a slope $m_i$ that is calculated by the shifter block 222 (i.e., the block 222 is responsible for the multiplication by a single power of two, which is performed in binary by a simple shift). The +/−1 multiplier 224 inverts the sign of the shifted data, if necessary, as defined by the relevant segment slope.

The input ports of the multiplexer 210(P+1) are provided with constant values provided by a plurality of constant data (CD) blocks 230. In particular, each CD block 230 provides a digital word that represents a segment's lower vertical axis limit $y_i$, which are selected to maximize the output spectral purity of the DDFS 100.

The outputs from the multiplexers 210(1) to 210(P+1) are processed by the addition/signal conditioning components 104 as described in conjunction with FIG. 3.

EXAMPLE 1

Figure 5:
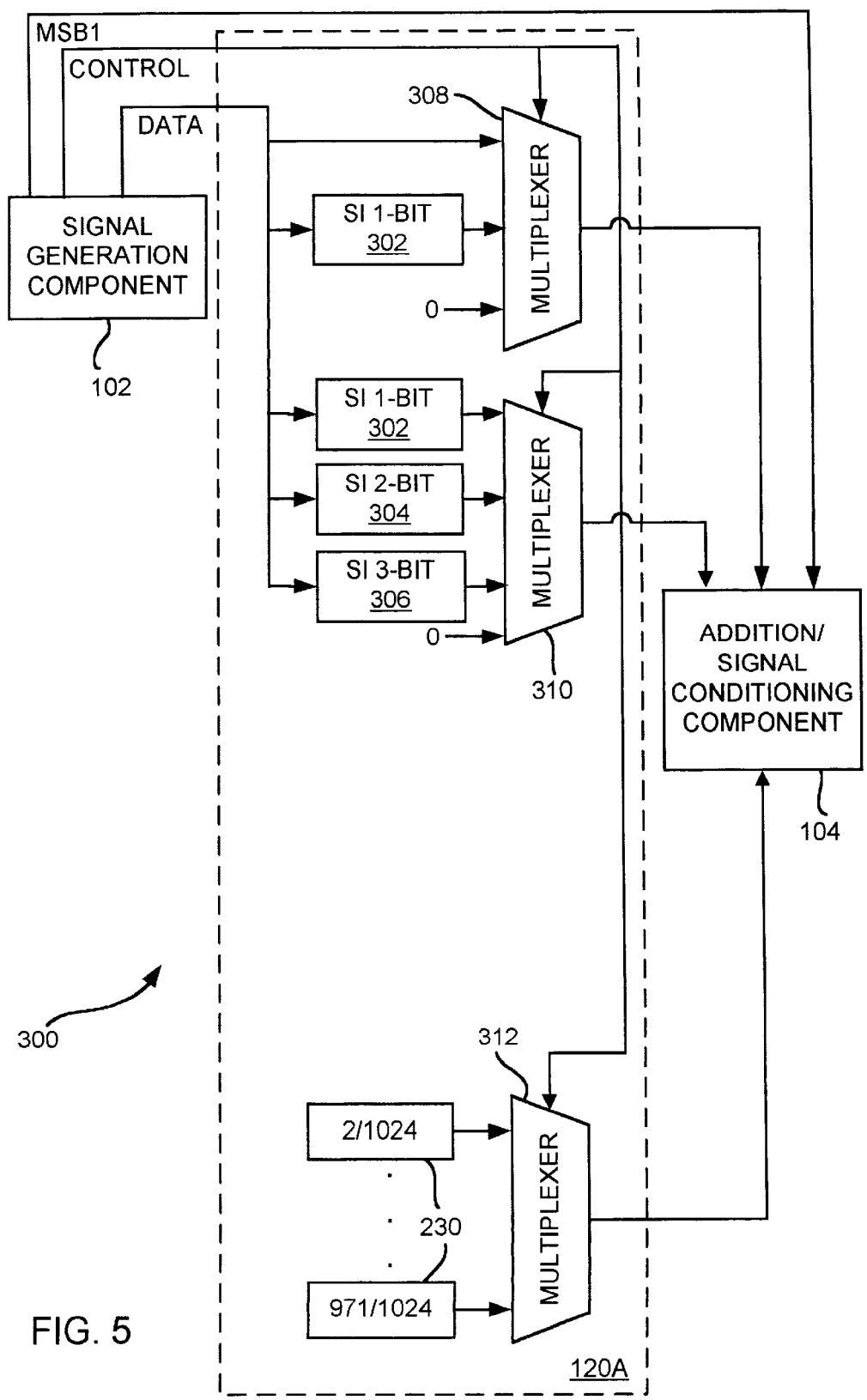
FIG. 5 illustrates a schematic representation of a first implementation example of a DDFS/PSAC according to the present invention.

FIG. 5 is a schematic representation of a first implementation example of a DDFS 300 including an addend generator/selector module 120A of the PSAC 110 according to the present invention. In example 1, the phase accumulator 112 accumulates a 16-bit input (the FCW from the FCU 114), on every clock cycle and passes through at most $2^{16}$ distinct states before revisiting any such state. The 12 bit output of the phase accumulator 112 is a ramp with a frequency that is equal to a clock frequency of the DDFS 300, divided by $2^{16}$, times the value of the FCW. The 12-bit output therefore takes values in the interval [0, $2^{12}$−1], or [0, 4095], representing a fraction of a full rotation around a unit circle.

For example, an output of zero from the phase accumulator 112 corresponds to angle zero, an output of 1024 corresponds to angle 1024/4096×2×π=π/2, 2048 corresponds to angle 2048/4096×2×π=π, and so forth. Phase accumulator output values in the interval [0, 1023] therefore correspond to angles in the first quadrant, i.e. in the interval [0, π/2] radians. For values in the interval [0, 2047], the sign of the corresponding sine amplitude is positive, and the MSB of the phase accumulator output is a 0. For values in the interval [2048, 4095], the sign of the sine amplitude is negative, and the MSB of the phase accumulator output is a 1.

An invert bit, identified as MSB2 (see FIG. 3), has value zero for angles in the first and third quadrants ([0, 1023] and [2048, 3071), and values 1 for angles in the second and fourth quadrants ([1024, 2047] and [3072, 4095]). The MSB2 is used to establish whether the remaining 10 bits from the phase accumulator 112 should be inverted or not, corresponding to the process of "counting up" from 0 to 1023, or "counting down" from 1023 down to 0.

In this way, only one quadrant of sinusoid amplitudes is calculated by the reminder of the DDFS 300, although the output will be for a full sinusoid (four quadrants).

The first quadrant of the sine function is approximated by eight linear segments, as defined by the following equation:

$$\sin\left(x \times \frac{\pi}{2}\right) \cong \begin{cases} \left(1+\frac{1}{2}\right)\left(x-\frac{0}{8}\right)+\frac{2}{1024}, & \frac{0}{8} \le x < \frac{1}{8} \\ \left(1+\frac{1}{2}\right)\left(x-\frac{1}{8}\right)+\frac{191}{1024}, & \frac{1}{8} \le x < \frac{2}{8} \\ \left(1+\frac{1}{4}\right)\left(x-\frac{2}{8}\right)+\frac{384}{1024}, & \frac{2}{8} \le x < \frac{3}{8} \\ \left(1+\frac{1}{8}\right)\left(x-\frac{3}{8}\right)+\frac{552}{1024}, & \frac{3}{8} \le x < \frac{4}{8} \\ (1+0)\left(x-\frac{4}{8}\right)+\frac{697}{1024}, & \frac{4}{8} \le x < \frac{5}{8} \\ \left(\frac{1}{2}+\frac{1}{4}\right)\left(x-\frac{5}{8}\right)+\frac{819}{1024}, & \frac{5}{8} \le x < \frac{6}{8} \\ \left(\frac{1}{2}+0\right)\left(x-\frac{6}{8}\right)+\frac{909}{1024}, & \frac{6}{8} \le x < \frac{7}{8} \\ \left(\frac{1}{8}+0\right)\left(x-\frac{7}{8}\right)+\frac{971}{1024}, & \frac{7}{8} \le x < \frac{8}{8} \end{cases} \quad (2)$$

wherein x is a fraction in the interval [0, 1], represented by a 10-bit binary number in the interval [0, 1023].

The amplitude of each of the linear segments is composed of the sum of three addends. Two of these addends are equal to an integer power of 2 (1, ½, ¼, ⅛) or 0, multiplied by x, and the third addend is a 10 bit fraction. Multiplication of a number x by a factor equal to an integer power of two can be accomplished by a bit shift that requires no processing. The bit shift process is shown schematically in FIG. 5 by 1-, 2- and 3-bit shifters 302, 304, and 306 (i.e., specific example of the SI blocks 220 of FIG. 4). Multiplication by zero also does not require an operation.

The three MSBs from the one's complement module 118 are applied to three multiplexers 308, 310 and 312 as the control signal to identify which one of eight input lines each multiplexer should select. The three MSBs take one of eight binary states, such as 000, 001, 010, . . . , 111, corresponding to the eight segments defined in Equation (2). Further, these eight binary states correspond to boundary values $x_i$ shown in Equation (2). Consequently, the seven LSBs (i.e., the data signal) from the signal generation component 102 corresponds to a subtraction ($x-x_i$). The multiplexers 308–312 each have eight input ports, numbered 0 to 7 inclusively.

The port assignments of the multiplexer 308 are:

(a) ports 0 to 4: a signal provided by the 7 LSBs (i.e., the data signal) from the one's complement module 118 of the signal generation component 102;

(b) ports 5 and 6: a signal provided by a 1-bit shift of the 7 LSBs (i.e., the data signal) from the one's complement module 118 generated by the 1-bit right-shifter 302; and (c) port 7: a signal equal to zero.

The port assignments of the multiplexer 310 are:

(a) ports 0 and 1: a signal provided by a 1-bit shift of the 7 LSBs (i.e., the data signal) from the one's complement module 118 of the signal generation component 102 generated by the 1-bit right-shifter 302;

(b) ports 2 and 5: a signal provided by a 2-bit shift of the 7 LSBs (i.e., the data signal) from the one's complement module 118 of the signal generation component 102 generated by the 2-bit right-shifter 304;

(c) ports 3 and 7: a signal provided by a 3-bit shift of the 7 LSBs (i.e., the data signal) from the one's complement module 118 of the signal generation component 102 generated by the 3-bit right-shifter 306; and (d) ports 4 and 6: a signal equal to zero.

The port assignments of the multiplexer 312 are constant values provided by the CD blocks 230 as follows:

(a) port 0: 2/1024;
(b) port 1: 191/1024;
(c) port 2: 384/1024;
(d) port 3: 552/1024;
(e) port 4: 697/1024;
(f) port 5: 819/1024;
(g) port 6: 909/1024; and
(h) port 7: 971/1024.

The outputs of the multiplexers 308, 310, and 312 are aligned prior to addition by the adder module 122 by zero-padding known in the art. The 10 MSBs of the multiplexer 312 output are defined by input port values defined above. The three LSBs of the multiplexer 312 output are always 0. The two LSBs of the multiplexer 310 output are also always zero, as no bit shift is applied to the inputs that would be sufficient to shift the 7 bit output down to those bit positions. Similarly, bit 9 of the multiplexer 310 output is also always a zero as there is no "shift by 0 position" applied to any of the inputs. Those of skilled in the art will appreciate that these zero values contribute to a reduction in computational effort necessary in the adder module 122 to combine the three addends that constitute the inputs.

The bit shifts applied to the inputs of the multiplexers 308/310 and the constant values applied to the inputs of the multiplexer 312 have been selected in example 1 to attain a high value of output spectral purity. The bit shifts and constant values may be increased, decreased, copied, interchanged, modified and otherwise varied, with the goal of modifying the output wave and affecting the output spectrum, without departing from the scope of this invention.

EXAMPLE 2

Figure 6:
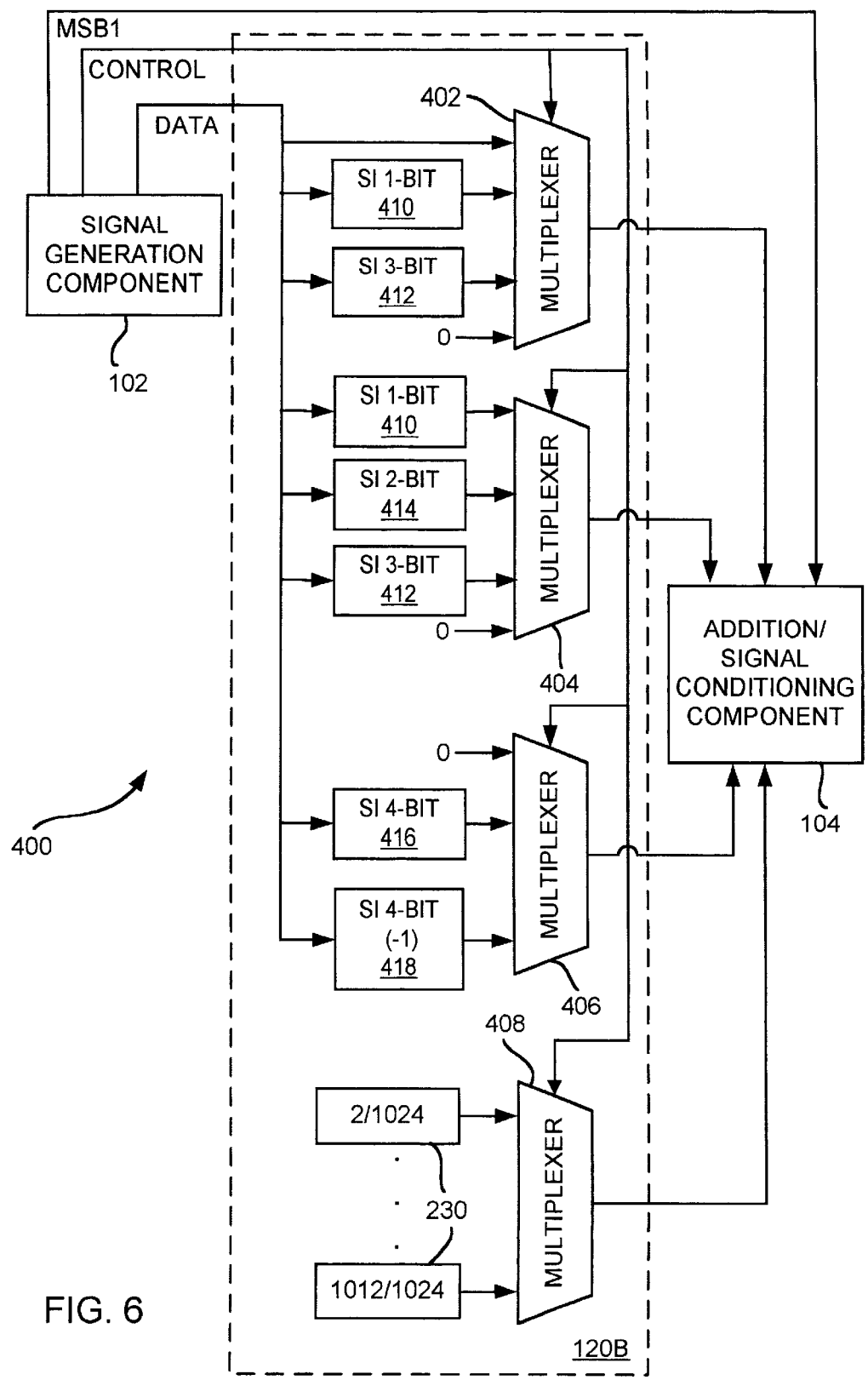
FIG. 6 illustrates a schematic representation of a second implementation example of a DDFS/PSAC according to the present invention.

FIG. 6 is a schematic representation of a second implementation example of a DDFS 400 including an addend generator/selector module 120B of the PSAC 110 according to the present invention. The signal generation component 102 and the addition/signal conditioning component 104 and their respective individual modules all function in the same way as described above. The difference between example 1 (FIG. 5) and example 2 (FIG. 6) resides in the configuration and structure of the addend generator/selector module 120B.

In particular, the four MSBs from the signal generation component 102 are applied to four multiplexers 402, 404, 406, and 408 as the control signal to identify which one of sixteen input lines each multiplexer should select. The multiplexers 402–408 each have 16 input ports, numbered 0 to 15 inclusively.

The port assignments of the multiplexer 402 are:

(a) ports 0 to 9: a signal provided by the 6 LSBs (i.e., the data signal) from the one's complement module 118 of the signal generation component 102;

(b) ports 10, 11 and 12: a signal provided by a 1-bit shift of the 6 LSBs from the one's complement module 118 generated by a 1-bit right-shifter 410;

(c) port 13: a signal provided by a 3-bit shift of the 6 LSBs from the one's complement module 118 generated by a 3-bit right-shifter 412; and (d) ports 14 and 15: a signal equal to zero.

The port assignments of the multiplexer 404 are:

(a) ports 0 to 4: a signal provided by a 1-bit shift of the 6 LSBs (i.e., the data signal) from the one's complement module 118 of the signal generation component 102 generated by the 1-bit right-shifter 410;

(b) ports 5, 6, 10, 13 and 14: a signal provided by a 2-bit shift of the 6 LSBs from the one's complement module 118 generated by a 2-bit right-shifter 414;

(c) ports 7 and 11: a signal provided by a 3-bit shift of the 6 LSBs from the one's complement module 118 generated by the 3-bit right-shifter 412; and (d) ports 8, 9, 12 and 15: a signal equal to zero.

The port assignments of the multiplexer 406 are:

(a) ports 0 to 4, 6, 10, 12, 13 and 14: a signal equal to zero;

(b) ports 5, 7, 8, 11 and 15: a signal provided by a 4-bit shift of the 6 LSBs from the one's complement module 118 generated by a 4-bit right-shifter 416; and (c) port 9: a signal provided by a 4-bit shift with inversion from the one's complement module 118 generated by a 4-bit right-shifter 418 with inversion (−1) (i.e., 1s for 0s and 0s for 1s).

The port assignments of the multiplexer 408 are constant values provided by the CD blocks 230 as follows:

(a) port 0: 2/1024;
(b) port 1: 101/1024;
(c) port 2: 199/1024;
(d) port 3: 294/1024;
(e) port 4: 386/1024;
(f) port 5: 480/1024;
(g) port 6: 565/1024;
(h) port 7: 644/1024;
(i) port 8 719/1024;
() port 9: 722/1024;
(k) port 10: 847/1024;
(l) port 11: 895/1024;
(m) port 12: 940/1024;
(n) port 13: 973/1024;
(o) port 14: 996/1024;
(p) port 15: 1012/1024;

In example 2, the output signals from the multiplexers 402, 404, 406 and 408 are 14 bits wide. The four MSBs from the outputs of the multiplexers 402, 404 and 406 are equal to zero, and the four LSBs from the multiplexer 408 are also equal to zero to align the outputs of the multiplexers 402–408 for summation by the adder module 122 of the addition/signal conditioning component 104. The adder module 122 adds four addends, which are the outputs from the multiplexers 402–408. In summary, the DAC 115 and LPF 116 receive a digital input in sign & magnitude format and produce an analog signal/waveform corresponding to the input.

A practical application of Example 2 is provided: the first quadrant of a sine function is approximated by sixteen linear segments (in contrast to the eight segments of Example 1). Coefficients for this equation are listed in Table 1.

TABLE 1

| segment i | $m_i$ | $y_i$ | $x_i$ | $x_{i+1}$ |
|---|---|---|---|---|
| 0 | 24/16 | 2/1024 | 0/16 | 1/16 |
| 1 | 24/16 | 101/1024 | 1/16 | 2/16 |
| 2 | 24/16 | 199/1024 | 2/16 | 3/16 |
| 3 | 24/16 | 294/1024 | 3/16 | 4/16 |
| 4 | 24/16 | 386/1024 | 4/16 | 5/16 |
| 5 | 21/16 | 480/1024 | 5/16 | 6/16 |
| 6 | 20/16 | 565/1024 | 6/16 | 7/16 |
| 7 | 19/16 | 644/1024 | 7/16 | 8/16 |
| 8 | 17/16 | 719/1024 | 8/16 | 9/16 |
| 9 | 15/16 | 786/1024 | 9/16 | 10/16 |
| 10 | 12/16 | 847/1024 | 10/16 | 11/16 |
| 11 | 11/16 | 895/1024 | 11/16 | 12/16 |
| 12 | 8/16 | 940/1024 | 12/16 | 13/16 |
| 13 | 6/16 | 973/1024 | 13/16 | 14/16 |
| 14 | 4/16 | 996/1024 | 14/16 | 15/16 |
| 15 | 1/16 | 1012/1024 | 15/16 | 16/16 |

Amplitudes of the linear segments are calculated as a sum of at most four addends. Three of these addends are equal to an integer power of 2 (1, ½, ¼, ⅛, 1/16) or 0, multiplied by x, and the fourth addend is a 10 bit fraction. For example, only two addends are present in segment 15: the value of x divided by 16 (i.e. x shifted 4 bit positions to the right) and a constant equal to 1012/1024. In segment 9, only three addends are present: the value of x, the value of x divided by 16 with a sign inversion, and a constant equal to 786/1024. Note that (1−1/16) has the same value (15/16) as (½+¼+⅛+1/16), but requires only one operation instead of three. In segment 5, where four addends are present: the value of x, the value of x divided by 4, the value of x divided by 16, and a constant equal to 480/1024.

The multiplexers 402–408 of FIG. 6 select one of sixteen input signals (applied to the input ports as described above), and pass this signal to the adder module 122. The selection is made according to the control signal represented by the four MSBs from the one's complement module 118 of the signal generation component 102. The four MSBs can take one of sixteen binary states, such as 0000, 0001, 0010, . . . , 1111, corresponding to the sixteen segments defined by Table 1. Further, these sixteen binary states correspond to boundary values $x_i$ shown in Table 1. The six LSBs from the one's complement module 118 correspond to a subtraction $(x-x_i)$. The outputs of the multiplexers 402–408 are aligned prior to addition by adder module 122 by appropriate zero-padding, as discussed previously.

Note that the discrepancy between the data of Table 1 and the input to the multiplexer 408 for segment 9 is intentional. In Table 1, the value of $y_9$ is shown equal to 786/1024, while the input to port 9 of the multiplexer 408 is equal to 722/1024. The reason for this discrepancy is related to the input of port 9 of the multiplexer 406, which is the bit-inversion output from the SI 4-bit shifter 418 with inversion (i.e., multiplication by −1).

The bit shifts (performed by shifters 410, 412, 414, 416, and 418) applied to the inputs of the multiplexers 402, 404 and 406 as well as the constant values applied to the inputs of the multiplexer 408 were selected in Example 2 to attain a high value of output spectral purity. These bit shifts and constant values may be increased, decreased, copied, interchanged, modified and otherwise varied, with the goal of modifying the output wave and affecting the output spectrum. Also, the size of the phase accumulator 112 input frequency control word and the output phase word size may be adjusted larger or smaller without departing from the scope of this invention.

EXAMPLE 3

Figure 7A:
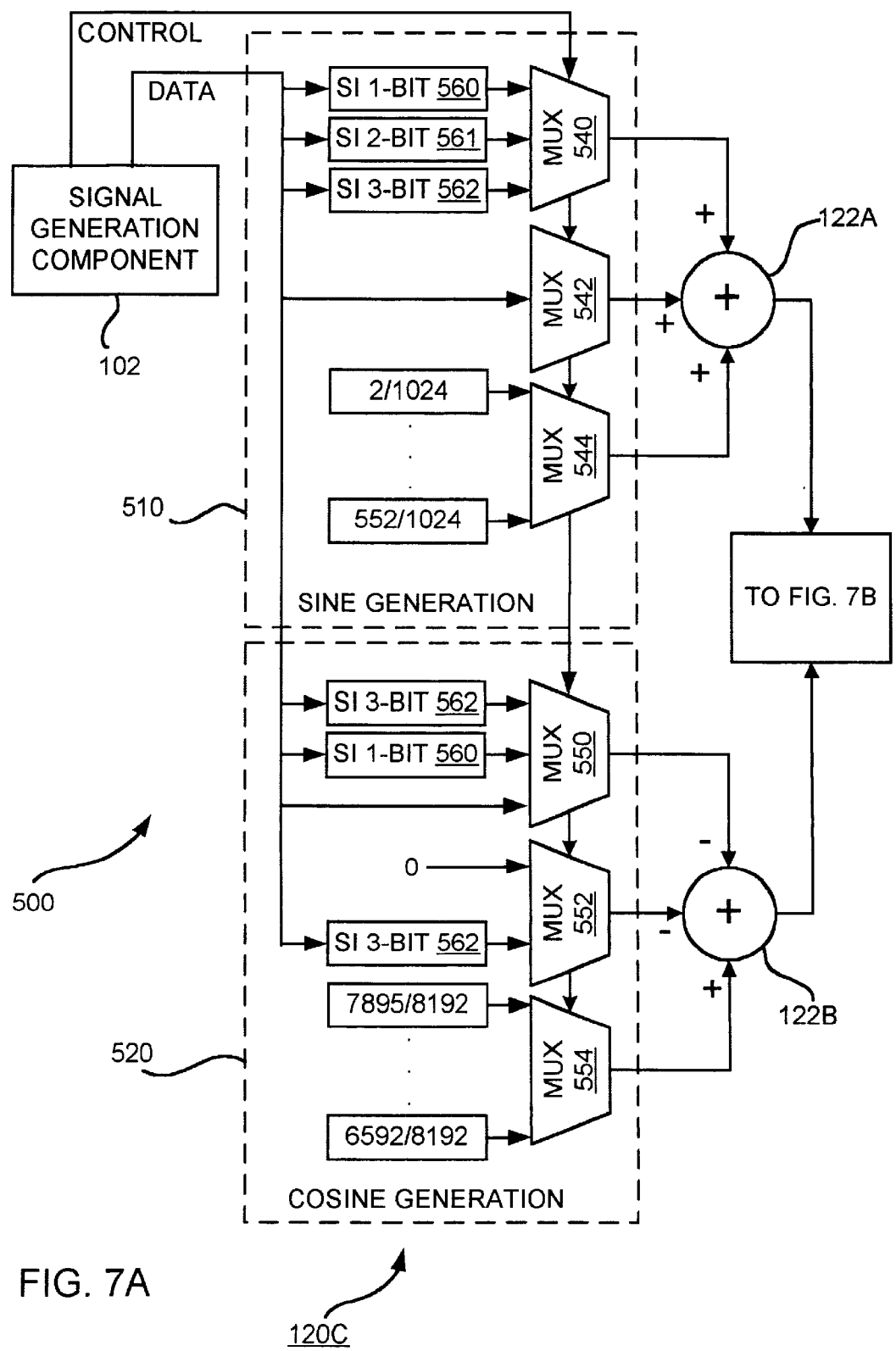
FIGS. 7A and 7B illustrate a schematic representation of a third implementation example of a DDFS/PSAC according to the present invention.
Figure 7B:
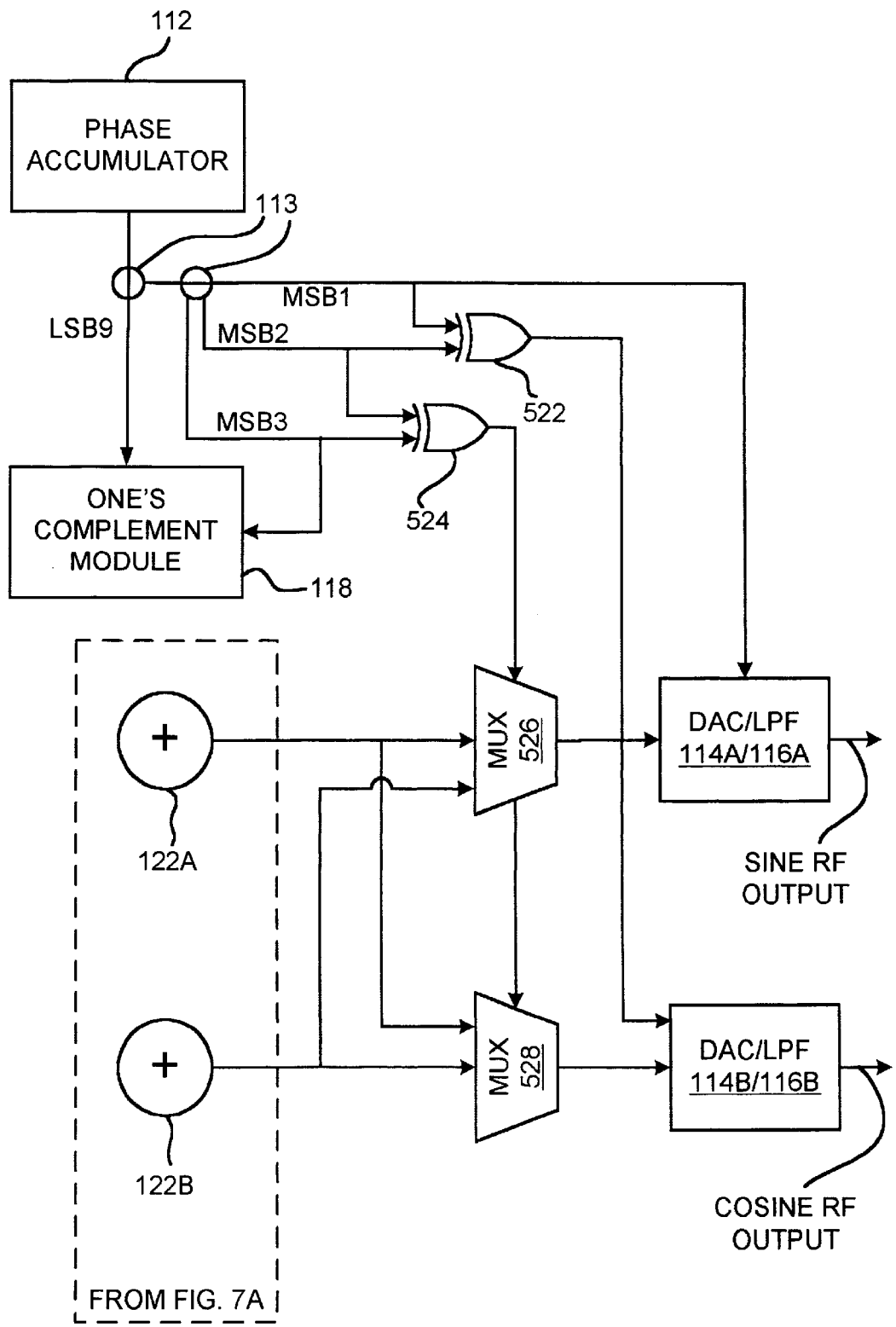

FIGS. 7A and 7B represent a schematic representation of a third implementation example of a DDFS 500 including an addend generator/selector module 120C of the PSAC 110 according to the present invention to generate a digital representation of two sinusoid waveforms in quadrature. The signal generation component 102 and the addition/signal conditioning component 104 and their respective individual modules all function in the same way as described above. In example 3, the addend selector module is divided into a sine generation module 510 and a cosine generation module 520 described in more detail below.

Referring to FIG. 7B, 12 bits from the phase accumulator 112 are separated into four parts: (1) the most significant bit (MSB1), (2) the second MSB (MSB2), (3) the third MSB (MSB3), and nine least significant bits (LSB9).

The MSB1 represents the sign of the sine output data and is applied to: (a) the DAC/LPF 114A/116A (identical to the DAC 115 and LPF 116 of FIG. 5 but shown together for simplicity) and (b) to an XOR gate 522. The MSB2 is applied to: (a) the XOR gate 522 and (b) another XOR gate 524. The MSB3 is applied to: (a) the one's-complement module 118 as a control signal and (b) the XOR gate 524. The LSB9 from the phase accumulator 112 are applied to the one's complement module 118 as an input signal (i.e., phase word) as previously described.

The output of the XOR gate 522 represents the sign of the cosine output data and is applied to the DAC/LPF 114B/116B. The output of the XOR gate 524 is a control signal applied to multiplexers 526 and 528. The multiplexers 526 and 528 receive inputs from the sine generation module 510 and the cosine generation module 520, and pass their output to a respective DAC/LPF group 114A/116B or 114B/116B according to the signal from the XOR gate 524.

Referring to FIG. 7A, the sine and cosine generation modules 510 and 520 have similar structures. The modules 510 and 520 receive as inputs the 2 MSBs from the one's complement module 118 of the signal generation component 102, which are applied to multiplexers 540, 542 and 544 (of module 510) and to multiplexers 550, 552 and 554 (of module 520) as the control signal.

The multiplexers 540, 542 and 544 of the sine generation module 510 each have 4 input ports, numbered 0 to 3 inclusively.

The port assignments of the multiplexer 540 are:
(a) ports 0 to 1: a signal provided by a 1-bit shift (by an SI 1-bit block 560-a specific example of the SI block 220) of the 7 LSBs (i.e., the data signal) from the one's complement module 118 of the signal generation component 102;
(b) ports 2: a signal provided by a 2-bit shift (by an SI 2-bit block 561) of the data signal; and
(c) port 3: a signal provided by a 3-bit shift (by an SI 3-bit block 562) of the data signal.

The port assignments of the multiplexer 542 are:
(a) ports 0 to 3: the data signal.

The port assignments of the multiplexer 544 are:
(a) port 0: 2/1024;
(b) port 1: 191/1024;1
(c) port 2: 384/1024; and
(d) port 3: 552/1024.

The multiplexers 550, 552 and 554 of the cosine generation module 520 each have 4 input ports, numbered 0 to 3 inclusively.

The port assignments of the multiplexer 550 are:
(a) ports 0: a signal provided by a 3-bit shift (by the SI 3-bit block 562) of the 7 LSBs (i.e., the data signal) from the one's complement module 118 of the signal generation component 102;
(b) ports 1 and 2: a signal provided by a 1-bit shift (by the SI 1-bit block 560) of the data signal; and
(c) port 3: the data signal.

The port assignments of the multiplexer 552 are:
(a) ports 0, 1 and 3: a signal equal to zero; and
(b) port 2: a signal provided by a 3-bit shift (by the SI 3-bit block 562) of the data signal.

The port assignments of the multiplexer 554 are:
(a) port 0: 7895/8192;
(b) port 1: 7780/8192;1
(c) port 2: 7314/8192; and
(d) port 3: 6592/8192.

An adder module 122 A receives as inputs the signals from the multiplexers 540, 542 and 544 of the sine generation module 510. An adder module 122B receives as inputs the signals from the multiplexers 550, 552 and 554 of the cosine generation module 520. The adder module 122A sums the three addends. The adder module 122B subtracts the sum of the outputs of the multiplexers 550 and 552 from the output of the multiplexer 554. This calculation corresponds to a linear segment with a negative slope, consistent with the first derivative of the cosine function being negative in the first octant.

In summary, the DDFS 500 generates two digital sinusoid waveforms in quadrature, i.e. with a 90 degree phase shift between them. The two modules 510 and 520 of the module 120C operate simultaneously. The sine generation module 510 produces one eighth of a sine wave corresponding to angles $[0, \pi/4]$. The cosine generation module 520 produces one eighth of a cosine wave corresponding to angles $[0, \pi/4]$. Within this octant, each module 510/520 operates following the principles described above except that each octant is divided into four segments. The two MSBs from the ones complement module 118 identify one of four segments for each of the generation modules 510/520, and in each case three multiplexers (540–544 for module 510 and 550–554 for module 520) select one addend to be passed to the respective adder module 122A/122B.

The reconstruction of a sinusoid waveform from a single quadrant was described for the DDFS 300. In example 3, full sine and cosine waves are reconstructed from two octants through the operation of the multiplexers 526 and 528.

EXAMPLE 4

Figure 8:
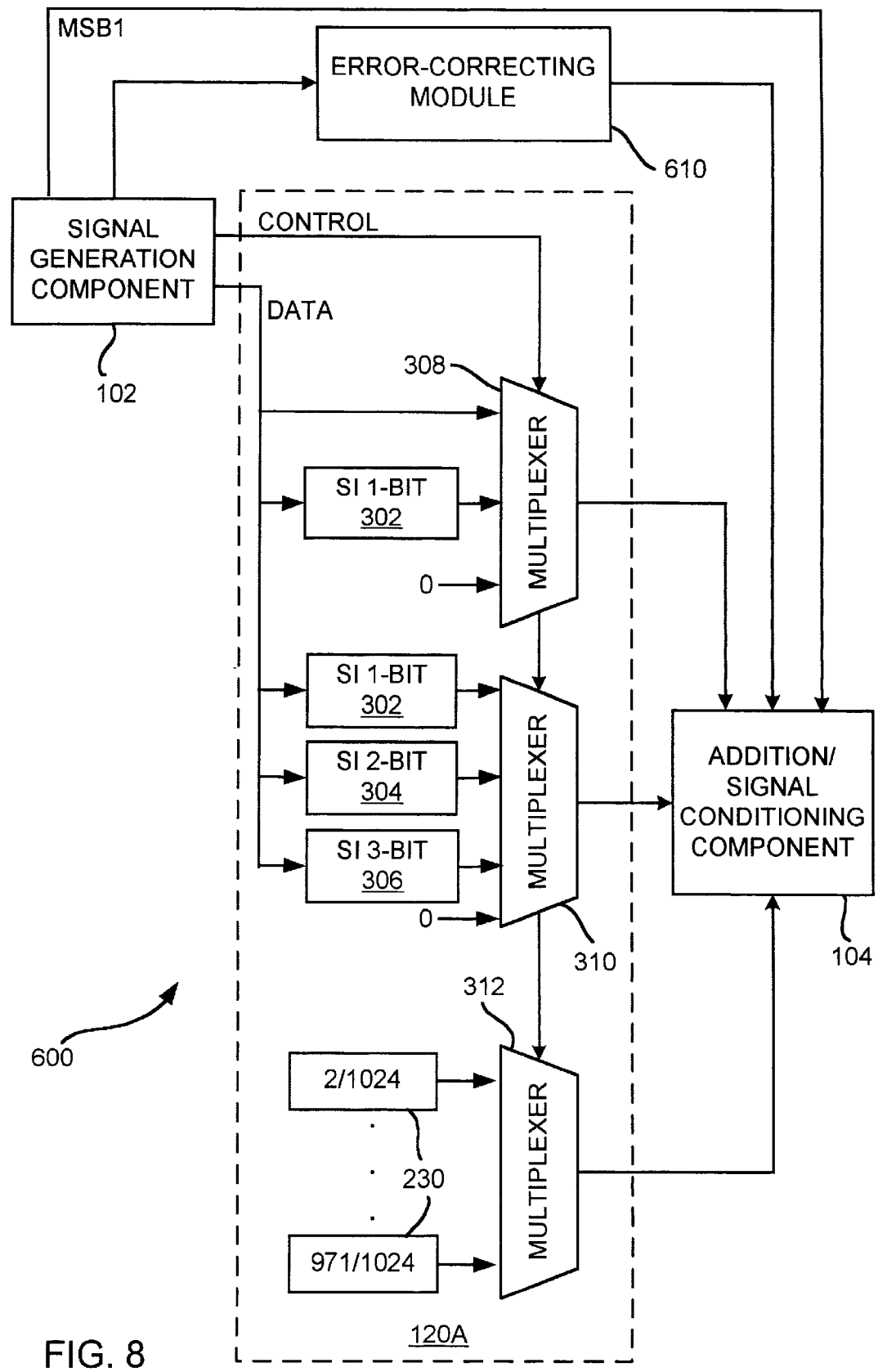
FIG. 8 illustrates a schematic representation of a fourth implementation example of a DDFS/PSAC with error-correction according to the present invention.

FIG. 8 is a schematic representation of a fourth implementation example of a DDFS 600 including the addend generator/selector module 120A of the PSAC 110 with an error-correcting module 810. The signal generation component 102 and the addition/signal conditioning component 104 and their respective individual modules all function in the same way as described above.

The DDFS 600 is similar to the DDFS 300 of FIG. 5, but includes the error-correcting module 610 that manages and stores error-correcting data (stored in a read only memory (ROM) for example). The error-correcting module 610 contains correction values to be applied to the sinusoid amplitude approximation calculated and output by the adder module 122 (see FIG. 3) of the addition/signal conditioning component 104. In particular, the correction values are added to the output of the adder module 122 in the addition/signal conditioning component 104 prior to processing by the DAC 115. The add functions described above can be combined into a single multiple-addend adder module (i.e., part of the adder module 122) or performed by separate adder modules 122. The correction values are equal in amplitude to the difference between the system output and an ideal sinusoid of identical frequency and amplitude, but expressed with infinite precision.

The purpose of the error-correcting module 610 is to reduce the amplitude error for any one sample prior to it being processed by the DAC 115 to reduce noise spurs and improve spectral purity. Alternatively, the PSAC 110 with the error-correcting module 610 can be used as a high resolution sinusoid function computer. In example 4, the DDFS 500 calculates the value of the sine function, but those of skill in the art will appreciate that simple modifications would convert this phase-to-sinusoid-amplitude converter such that it would calculate the cosine function.

Computer Implementation

The embodiments and examples of the present invention can be implemented in conventional computer programming languages (i.e., procedural programming languages and object oriented languages). Further, embodiments and examples of the present invention can be implemented as pre-programmed hardware elements, other related components, or a combination of hardware and software components.

Embodiments and examples can also be implemented as a computer program product for use with a computer system. Such an implementation may include a series of computer instructions fixed either on a tangible medium, such as a computer readable medium (e.g., diskette, CD-ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared, etc.).

The series of computer instructions (or code segments) embodies all or part of the functionality previously described herein. Those skilled in the art will understand that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation, preloaded with a computer system (e.g., on system ROM or fixed disk), or distributed from a server over a network (e.g., the Internet). Also, embodiments and examples of the present invention may be implemented as a combination of both software (e.g., a computer program product) and hardware (termed mechanisms or modules).

Although the embodiments and variations of a direct digital frequency synthesizer described herein have been described as receiving a FCW input equal to a digital one, it should be apparent that other digital values can be selected. The selected digital value will of course determine the number of intermediate digital samples generated by the direct digital frequency synthesizer.

As those of skill in the art will appreciate, the present invention allows for the generation of a sinusoid waveform or of two quadrature sinusoid waveforms while reducing system complexity, hardware realization costs and power consumption, and while maintaining a high spectral purity of the synthesized waveform or waveforms.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for determining an approximation of a sinusoidal amplitude for a given phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the apparatus comprising:

(a) a calculation mechanism receiving the signal for generating a set of outputs for each one of the plurality of linear line segments as a product of (i) a horizontal displacement representing a difference between the given phase angle and the lower horizontal-axis bound and (ii) each one of the plurality of slope elements;

(b) a selector mechanism for selecting (i) one of the set of outputs from the calculation mechanism and (ii) one of the lower vertical-axis bounds based on a selected one of the plurality of linear line segments; and (c) an aggregation mechanism for evaluating the approximation of the sinusoidal amplitude as an aggregate of the selected one of the set of outputs from the selector mechanism and the one of the lower vertical-axis bounds.

2. The apparatus of claim 1, wherein the number of linear line segments has a value equal to $2^a$, where a $\in \{0, 1, 2, 3, \ldots\}$ and each one of the plurality of slope elements has a value selected from a group consisting of $\pm 2^b$ and zero, where b $\in \{\ldots, -2, -1, 0, 1, 2, \ldots\}$.

3. The apparatus of claim 2, wherein a ratio between the largest and smallest values of the slope elements is equal to or less than $2^{32}$.

4. The apparatus of claim 2, wherein the calculation mechanism includes a plurality of shift and inversion mechanisms having a shifter for shifting the signal to generate a shifted data signal having a sign and an inverter for inverting the sign of the shifted data signal as prescribed by the plurality of slope elements of the slope of each one of the plurality of linear line segments.

5. The apparatus of claim 4, wherein the selector mechanism includes a plurality of interconnected data signal multiplexers and a constant data multiplexer, the data signal multiplexers receive the signal in a selected configuration after processing by the shift and inversion mechanisms and the constant data multiplexer receives the lower vertical axis bounds of the plurality of linear line segments, and wherein the aggregation mechanism aggregates selected outputs from the data signal multiplexers and the constant data multiplexer to form the approximation of the sinusoidal amplitude.

6. The apparatus of claim 2, further comprising a signal generator for generating the signal.

7. The apparatus of claim 6, wherein the signal generator includes a frequency control unit for generating a multiple bit frequency control word; a phase accumulator for accumulating the frequency control word to provide an accumulator output word; a partitioner for partitioning the accumulator output word to a first control signal, a second control signal and a phase word; and an inverter for inverting the phase word when signaled by the second control signal, wherein output of the inverter includes the signal.

8. The apparatus of claim 7, further comprising a digital-to-analog converter for converting the approximation of the sinusoidal amplitude into an analog waveform and a low pass filter for filtering and buffering the analog signal.

9. The apparatus of claim 8, wherein the first control signal is received by the digital-to-analog converter and includes a value of zero when the sign of the approximation of the sinusoid amplitude is positive and a value of one when the sign of the approximation of the sinusoid amplitude is negative.

10. The apparatus of claim 9, wherein the second control signal has a value of zero when the given phase angle is in the first quadrant and a third quadrant of the sinusoid function and a value of one when the given phase angle is in a second and a fourth quadrant of the sinusoid function.

11. The apparatus of claim 7, wherein a combination of the calculation mechanism and the selector mechanism are divided into a sine generation module for generating a sine output data based on the signal and a cosine generation module for generating a cosine output data based on the signal.

12. The apparatus of claim 11, further comprising a first multiplexer for multiplexing the sine output data and the cosine output data to generate a sine waveform responsive to the first and second control signals and a third control signal derived from the signal and a second multiplexer for multiplexing the sine output data and the cosine output data to generate a cosine waveform responsive to the first, second, and third control signals.

13. In a phase-to-sinusoid-amplitude converter, a method of determining an approximation of a sinusoidal amplitude for a prescribed phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the method comprising:

(f) evaluating a set of values for each one of the plurality of linear line segments as a product of (i) a horizontal displacement representing a difference between the prescribed phase angle and the lower horizontal-axis bound and (ii) each one of the plurality of slope elements; and (g) aggregating a selected set of values determined in step (a) and a selected one of the lower vertical-axis bounds for a selected linear line segment to form the approximation of the sinusoidal amplitude for the prescribed phase angle.

14. The method of claim 13, wherein the number of linear line segments has a value equal to $2^a$, where $a \in \{0, 1, 2, 3, \ldots\}$ and each one of the plurality of slope elements has a value selected from a group consisting of $\pm 2^b$ and zero, where $b \in \{\ldots, -2, -1, 0, 1, 2, \ldots\}$.

15. The method of claim 14, wherein the step of evaluating includes shifting the signal to generate a shifted data signal having a sign and inverting the sign of the shifted data signal as prescribed by the plurality of slope elements of the slope of each one of the plurality of linear line segments.

16. A computer readable medium having stored thereon computer-executable instructions for determining an approximation of a sinusoidal amplitude for a prescribed phase angle from a signal representing a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements, the computer-executable instructions comprising the steps for:

(a) step for evaluating a set of values for each one of the plurality of linear line segments as a product of (i) a horizontal displacement representing a difference between the prescribed phase angle and the lower horizontal-axis bound and (ii) each one of the plurality of slope elements; and (b) step for aggregating a selected set of values determined in step (a) and a selected one of the lower vertical-axis bounds for a selected linear line segment to form the approximation of the sinusoidal amplitude for the prescribed phase angle.

17. The computer readable medium of claim 16, wherein the number of linear line segments has a value equal to $2^a$, where $a \in \{0, 1, 2, 3, \ldots\}$ and each one of the plurality of slope elements has a value selected from a group consisting of $\pm 2^b$ and zero, where $b \in \{\ldots -2, -1, 0, 1, 2, \ldots\}$.

18. The computer readable medium of claim 17, wherein the step for evaluating includes a step for shifting the signal to generate a shifted data signal having a sign and a step for inverting the sign of the shifted data signal as prescribed by the plurality of slope elements of the slope of each one of the plurality of linear line segments.

19. An apparatus comprising:

(a) means for generating a signal approximating a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements;

(b) generator means receiving the signal for generating a set of outputs for each one of the plurality of linear line segments as a product of a horizontal displacement representing a difference between the given phase angle and the lower horizontal-axis bound and each one of the plurality of slope elements;

(c) selector means for selecting one of the set of outputs from the generator means and one of the lower vertical-axis bounds based on a selected one of the plurality of linear line segments;

(d) means for evaluating an approximation of a sinusoidal amplitude as an aggregate of the selected one of the set of outputs from the selector mechanism and the one of the lower vertical-axis bounds; and (e) means for converting the approximation of the sinusoidal amplitude from the adder means into an analog signal.

20. The apparatus of claim 19, wherein the means for generating includes a frequency control unit for generating a multiple bit frequency control word; a phase accumulator for accumulating the frequency control word to provide an accumulator output word; a partitioner for partitioning the accumulator output word to a first control signal, a second control signal and a phase word; and an inverter for inverting the phase word when signaled by the second control signal, wherein output of the inverter includes the signal.

21. The apparatus of claim 20, further comprising an error-correcting module for detecting an error of the accumulator output word for application to the approximation of the sinusoid amplitude, the error representing the difference between the approximation of the sinusoid amplitude and an ideal sinusoid of identical frequency and amplitude.

22. In a direct digital frequency synthesizer (DDFS), a method of determining an approximation of a sinusoidal amplitude for a prescribed phase angle, the method comprising:

(a) generating a signal approximating a quadrant of a sinusoid function defined by a plurality of linear line segments of substantially equal length, each linear line segment being defined by: a lower horizontal-axis bound; a lower vertical-axis bound; and a slope represented as a sum of a plurality of slope elements;

(b) generating a set of outputs for each one of the plurality of linear line segments as a product of a horizontal displacement representing a difference between the given phase angle and the lower horizontal-axis bound and each one of the plurality of slope elements;

(c) selecting one of the set of outputs generated from step (b) and one of the lower vertical-axis bounds based on a selected one of the plurality of linear line segments; and (d) evaluating an approximation of a sinusoidal amplitude as an aggregate of the selected one of the set of outputs from step (c) and the one of the lower vertical-axis bounds; and (e) converting the approximation of the sinusoidal amplitude into an analog signal.

23. The method of claim 22, wherein the step of generating a signal includes generating a multiple bit frequency control word; accumulating the frequency control word to provide an accumulator output word; partitioning the accumulator output word to a first control signal, a second control signal and a phase word; and inverting the phase word when signaled by the second control signal, wherein output of the inverter includes the signal.

* * * * *